United States Patent [19]
Petersen et al.

[11] Patent Number: 5,585,119
[45] Date of Patent: Dec. 17, 1996

[54] DEVICE FOR PREPARATION OF EXPANDED THERMOPLASTIC MICROSPHERES

[75] Inventors: Jorgen Petersen, Sundsvall; Lars-Olov Svedberg, Kvissleby, both of Sweden

[73] Assignee: Casco Nobel AB, Stockholm, Sweden

[21] Appl. No.: 478,390

[22] Filed: Jun. 7, 1995

Related U.S. Application Data

[62] Division of Ser. No. 218,232, Mar. 28, 1994, Pat. No. 5,484,815, which is a continuation of Ser. No. 665,929, Mar. 5, 1991, abandoned, which is a continuation of Ser. No. 369,773, Jun. 22, 1989, abandoned.

[30] Foreign Application Priority Data

Jun. 23, 1988 [SE] Sweden ................................. 8802387
Feb. 16, 1989 [SE] Sweden ................................. 8900541

[51] Int. Cl.$^6$ ................................................... C08J 9/22
[52] U.S. Cl. ........................ 425/4 C; 222/412; 264/51; 264/415; 425/174.4; 425/404; 425/445; 425/DIG. 55
[58] Field of Search ............................... 425/4 R, 4 C, 425/DIG. 55, 174.4, 404, 445; 264/41, 51, 55, 53, DIG. 9, 415; 222/412, 413, 196, 252

[56] References Cited

U.S. PATENT DOCUMENTS

| | | | |
|---|---|---|---|
| 994,875 | 6/1911 | Schilling | 222/252 |
| 2,488,446 | 11/1949 | Swiss | 425/DIG. 55 |
| 3,227,424 | 1/1966 | Cunningham | 264/DIG. 9 |
| 3,386,716 | 6/1968 | Doyle et al. | 264/DIG. 9 |
| 3,471,603 | 10/1969 | Patrick et al. | 425/4 C |
| 3,615,972 | 10/1971 | Morehouse, Jr. et al. | 156/79 |
| 3,667,665 | 6/1972 | Spencer | 222/412 |
| 3,723,362 | 3/1973 | Battigelli | 521/58 |
| 3,821,128 | 6/1974 | Garner | 521/56 |
| 3,821,342 | 6/1974 | Hurd | 264/DIG. 9 |
| 3,914,360 | 10/1975 | Gunderman et al. | 264/DIG. 9 |
| 4,073,843 | 2/1978 | Smith | 264/53 |
| 4,108,806 | 8/1978 | Cohrs et al. | 521/56 |
| 4,278,628 | 7/1981 | Montgomery et al. | 264/DIG. 9 |
| 4,397,799 | 8/1983 | Edgren et al. | 264/53 |
| 4,407,980 | 10/1983 | Gagliani et al. | 521/99 |
| 4,493,442 | 1/1985 | Hanson, Jr. | 222/412 |
| 4,496,086 | 1/1985 | Duchadeau | 222/412 |
| 4,525,485 | 6/1985 | Maeda et al. | 264/DIG. 9 |
| 4,673,694 | 6/1987 | Meyer et al. | 521/57 |
| 4,721,588 | 1/1988 | Burchard et al. | 264/DIG. 9 |
| 4,722,943 | 2/1988 | Melber et al. | 521/57 |
| 4,897,759 | 1/1990 | Becker. | |
| 5,108,673 | 4/1992 | Wegmann | 264/DIG. 9 |

FOREIGN PATENT DOCUMENTS

| | | | |
|---|---|---|---|
| 95714 | 7/1983 | European Pat. Off. . | |
| 0112807 | 7/1984 | European Pat. Off. . | |
| 2510943 | 9/1976 | Germany | 264/DIG. 9 |
| 59-59732 | 4/1984 | Japan . | |
| 1247950 | 9/1971 | United Kingdom . | |

OTHER PUBLICATIONS

The Plastics Institute, Transactions and Journal, vol. 29, No. 80, The Plastics Institute, London Apr. 1961 pp. 48–49.
Plastics Technology, "Fabrication Methods for Expandable Polystyrene" Jul. 1956, pp. 452–454.

*Primary Examiner*—Jay H. Woo
*Assistant Examiner*—Joseph Leyson
*Attorney, Agent, or Firm*—Burns, Doane, Swecker & Mathis, L.L.P.

[57] ABSTRACT

An apparatus for producing expanded thermoplastic microspheres, including a belt conveyor (A) having an endless belt (1) for conveying microspheres. A device (B) for infrared (IR) heating, including a plurality of IR lamps (4) is located above the belt (1). A dosing device (C) for the dried unexpanded microspheres is located at one end of the belt conveyor and in conjunction with the belt (1). A collecting device (D) for expanded microspheres is located at the other end of the belt conveyor and in conjunction with the belt (1).

7 Claims, 1 Drawing Sheet

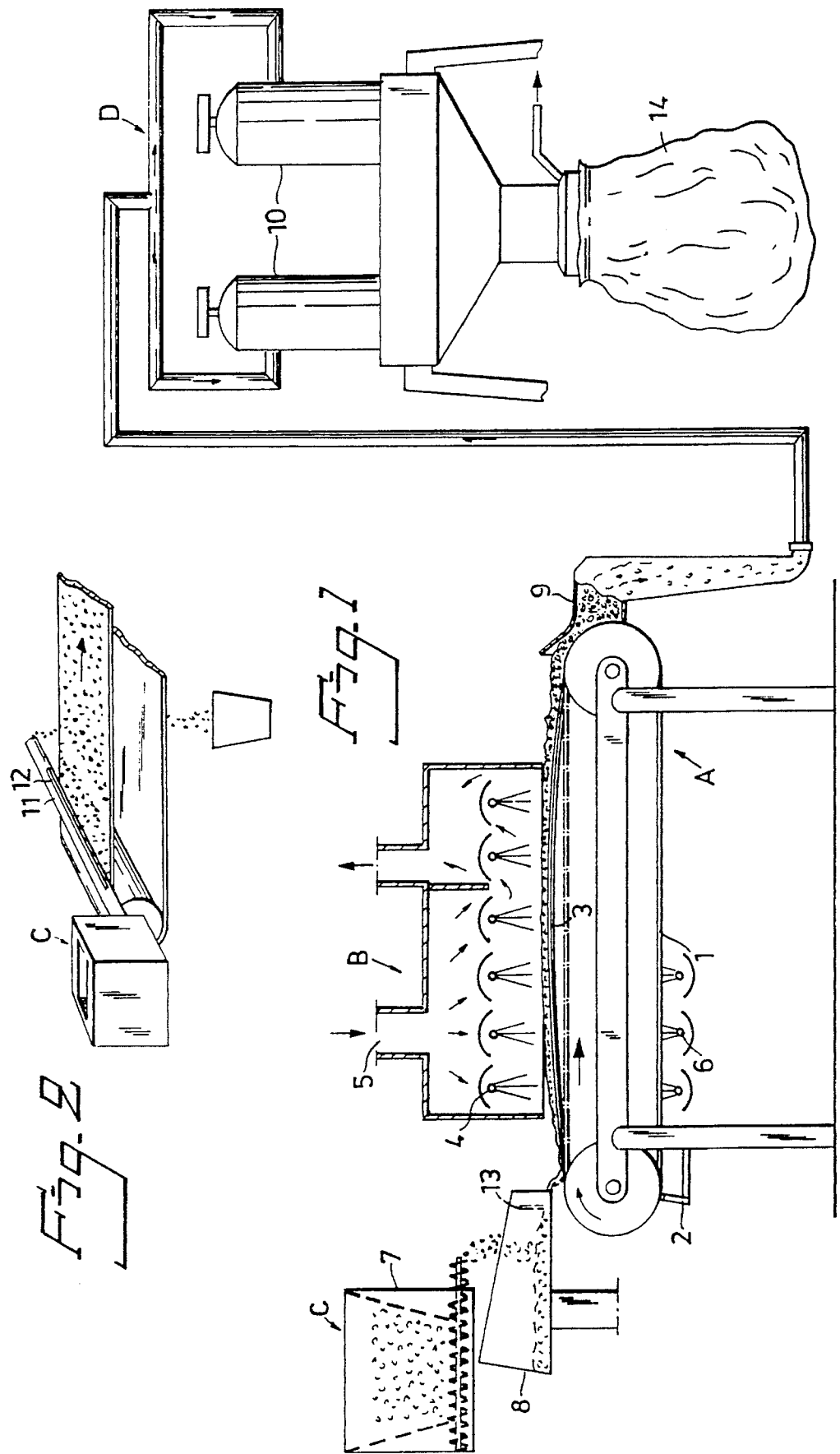

DEVICE FOR PREPARATION OF EXPANDED THERMOPLASTIC MICROSPHERES

This application is a divisional, of application Ser. No. 08/218,232, filed Mar. 28, 1994, U.S. Pat. No. which is a continuation of application Ser. No. 07/665,929, filed Mar. 5, 1991, now abandoned, which is a continuation of application Ser. No. 07/369,773, filed Jun. 22, 1989, now abandoned.

FIELD OF INVENTION

The present invention relates to a method of producing expanded thermoplastic microspheres, more particularly a method of producing expanded thermoplastic microspheres without agglomerate formation, and to an apparatus for expanding said microspheres.

DESCRIPTION OF THE PRIOR ART

The production and use of expandable thermoplastic microspheres is disclosed in, inter alia, U.S. Pat. No. 3,615,972. The thermoplastic shells of the spheres may consist of, for example, polymers or copolymers that have been polymerised from monomers such as vinyl chloride, vinylidene chloride, acrylonitrile, methyl methacrylate, or styrene, or mixtures thereof. The particle size of the unexpanded spheres, and thus of the expanded spheres, may vary within wide limits and is selected on the basis of the properties desired in the finished product. As examples of particles sizes of unexpanded spheres, mention may be made of 1 µm to 1 mm, preferably 2 µm to 0.5 mm, and especially 5 µm to 50 µm. Upon expansion, the diameter of the microspheres is increased by a factor 2 to 5. The unexpanded spheres contain volatile liquid blowing agents which are gasified upon supply of heat when heat is supplied, the polymer shell softens and the spheres expand when the blowing agent is gasified. The blowing agents may consist of freons such as trichlorofluoromethane, hydrocarbons such as n-pentane, i-pentane, neopentane, butane, i-butane or other blowing agents conventionally employed in microspheres of the type here referred to. The blowing agent preferably constitutes 5–30% by weight of the weight of the microsphere. One example of a suitable and commercially available microsphere product is Expancel® which has a thermoplastic shell of a vinylidene chloride/acrylonitrile copolymer and isobutane as blowing agent.

The expandable thermoplastic microspheres of U.S. Pat. No. 3,615,972 are produced in an aqueous suspension. The process water is removed by, for example, sedimentation, centrifugation or filtration, or by some other suitable technique. The microspheres are obtained in the form of a wet cake having a dry solids content of about 65%. The unexpanded microspheres may be used as such for in situ expansion, i.e. the spheres are mixed with different types of material which are then heated to make the microspheres expand. Examples of commercial applications of this type are paper, cardboard and printing ink.

Thermoplastic microspheres also have applications where the temperature is not increased during the process, or the temperature is not sufficiently high to make the microspheres expand. For these applications, use is made of preexpanded microspheres which may be dry or wet. Examples of commercial applications for this type of microspheres is polyester for dry spheres and paint for wet spheres.

Processes for the production of both wet and dry expanded microspheres are known. U.S. Pat. No. 4,397,799 discloses a process of drying and expanding microspheres by atomising a dispersion of the spheres in an inert liquid in a hot inert gas. EP 112807 discloses a process for expanding expandable microspheres, in which a slurry of the unexpanded spheres in an inert liquid is supplied into a pressure zone and expanded by coming into contact with water vapour. The spheres are then caused to leave the pressure zone under a considerable pressure drop. Important factors of these processes are the design of the expansion equipment, the process conditions, such as temperature, time, and the concentration of spheres within the slurry. Without suitable adaptation of these factors, an expanded product is obtained which contains large amounts of agglomerates, i.e. cemented expanded spheres. A minor amount of agglomerates (<1%) cannot be avoided because the microspheres stick to the wall of the expansion equipment and subsequently come loose, resulting in small agglomerates. A minor amount of agglomerates may be tolerated, but is undesirable.

The agglomerate formation has been deemed to depend entirely upon the thermoplastic character of the microspheres. If expansion occurs at a temperature higher than normal, a larger number of agglomerates are obtained. An increase by one or two degrees is sufficient to cause difficulties. Expansion of a microsphere grade having a higher glass transition temperature requires a higher expansion temperature, which results in a larger number of agglomerates or a higher tendency to agglomeration.

SUMMARY OF THE INVENTION

The present invention, such as it is disclosed in the appended claims, now provides a technically simple solution for the production of expanded thermoplastic microspheres having a very low content of agglomerates. The invention is based on the discovery that unexpanded microspheres that have been dried to a certain dry solids content, can be heated in a simple manner and expanded to entirely free microspheres, without agglomerates. Contrary to what could be expected, it has been found that the spheres, although they are thermoplastic, do not stick together if they have a dry solids content exceeding 98% by weight before the expansion. It has also been found that microspheres that have been dried to a dry solids content exceeding 98% by weight and then are wetted again, can still be expanded without sticking together. The drying process modifies the surface characteristics of the microspheres, i.e. the tendency to sticking together has been removed.

BRIEF DESCRIPTION OF THE DRAWINGS

FIG. 1 is a schematic lateral view of the apparatus according to the invention; and FIG. 2 is a lateral view of a dosing device.

DETAILED DESCRIPTION OF THE PREFERRED EMBODIMENTS

In order to obtain agglomerate-free microspheres, it is important that the drying process is carried out in a satisfactory manner. Microspheres dried at room temperature and not subjected to any kind of working form a lumpy cemented mass resembling concrete. If this mass is expanded, a large number of agglomerates are obtained, but no free expanded microspheres. Drying must therefore be carried out concurrently with mechanical working or other form of agitation.

The present invention obviates the need for the complicated and costly expansion equipment described in the earlier patents. In carrying the method of the present invention into effect, the dry unexpanded microspheres can be expanded in a conventional heating cabinet with fan and exhausting device. The spheres can be placed in cups or on trays. This expansion technique is so simple that it can be carried out by the users of the expanded microspheres. This means that a user can proceed from the more manageable and inexpensive, dry, unexpanded spheres, instead of from the expanded spheres which he had to use up to now and which are disadvantageous in that they are more costly and have a volume several times greater and, furthermore, give rise to far greater dusting problems.

It is, of course, also possible to use a different expansion equipment for the expansion of the dried microspheres. Mention may here by made of expansion by infrared (IR) heating, heating by radiation heat, by contact with hot air, or by means of microwaves or steam. A further conceivable expansion equipment is a heated screw extruder.

Especially preferred is the expansion apparatus disclosed in the claims. It comprises a belt conveyor, a device for IR heating, a device for dosing the dry unexpanded microspheres, and a device for collecting the expanded spheres. Such an expansion equipment is simpler and less expensive than the prior art technique comprising, for example, spray-drying. It has surprisingly been found that this expansion equipment produces very little dust. The disposition of the expanded spheres on the belt is that of a loose association, whereby dusting is prevented. In appearance they resemble small scraps or "cornflakes." After collection, however, the spheres have free-flowing characteristics, like spray-dried microspheres. In comparison with spray-drying where expanded spheres are frequently deposited on hot surfaces in, for example, the drying chamber, the piping and the filter, the expansion equipment of the present invention brings the advantage that its belt conveyor has no hot parts, the belt excepted. The air conveying the expanded spheres from the belt is heavily diluted with air of room temperature so that the spheres, when leaving the belt, usually have a temperature not exceeding about 30° C.

The initially wet unexpanded microspheres must be dried under some form of agitation, for example by mechanical working or by means of an air flow, such as in a fluidised bed. The wet spheres can be dried for example under agitation in a Morton type mixer. Other conceivable mixers are planetary mixers, Z-blade mixers, propeller mixers, or dissolvers. The dry solids content at which expansion without agglomeration is obtained must exceed 98% by weight, preferably 99% by weight.

Microspheres suitable to be used in the method according to the present invention may be produced from, for example, polystyrene or copolymers of styrene and up to 40% by weight (based on styrene) of copolymerised ethylenically unsaturated monomers, especially acrylonitrile. Other suitable polymers are copolymers of vinylidene chloride and up to 40% by weight (based on vinylidene chloride) of acrylonitrile or vinyl chloride. Preferred copolymers are 0–80% by weight vinylidene chloride, 0–75% by weight acrylonitrile, and 0–70% by weight methyl methacrylate, and especially preferred are 0–55% by weight vinylidene chloride, 40–75% by weight acrylonitrile, and 0–50% by weight methyl methacrylate. However, the invention is in no way restricted to these since the method according to the invention can be used with all types of thermoplastic microspheres. A suitable particle size of the microspheres is within the range 3–100 μm, preferably 5–50 μm.

The dry unexpanded microspheres can, if desired, be mixed with fillers of different kinds. As suitable fillers can be mentioned such fillers being capable of withstanding the expansion temperature of the microspheres. It is preferred to use inorganic fillers such as e.g. talc, chalk, kaolin and dolomite.

The preferred expansion apparatus will now be described with reference to the accompanying drawings.

The apparatus comprises a belt conveyor (A), a device (B) for IR heating, a dosing device (C) for the dried unexpanded spheres, and a collecting device (D) for the expanded spheres. The belt conveyor comprises an endless belt (1) travelling around two rollers. The belt should be made of teflon which has excellent release characteristics and excellent resistance to temperature. To prevent the belt from being charged with static electricity, antistatic treatment is recommended. If electrically conductive black pigment is used for the antistatic treatment, there is obtained the further advantage that the black belt absorbs heat, which means a more uniform expansion. Optionally, the antistatic belt may be supplemented with a conductor (2) of static electricity. The belt conveyor may also be provided with a sliding plate (3) underneath the upper run of the belt conveyor. The sliding plate has two functions with thin belts, it functions as a support to smoothen the belt. Thin belts have a tendency to unevenly engage the frame of the belt conveyor. The sliding plate may be formed with a span of some extent and secured at one end only, whereby it will resiliently engage and stretch the belt. The sliding plate is secured at one end by means of two screws in the frame of the belt conveyor. The sliding plate also imparts a more uniform temperature to the belt.

The device for IR heating (B) is located above the belt (1) and comprises a suitable number of IR lamps for short-wave IR (4). The lamps are mounted on a cassette. To prevent overheating, the cassette may be air-cooled (5). The lamp power can be controlled. There are two possibilities of temperature control. The IR lamp power can be controlled, or the distance between the lamps and the belt can be changed. The easiest way is to control the power and use a fixed distance between the lamps and the belt. It is also possible to mount additional IR lamps, if this should be necessary in order to maintain a sufficiently high temperature. These additional lamps can be mounted at a belt section where there are no microspheres (6). The expansion temperature may be about 100° C. or higher, but exact measurements are not necessary. On the other hand, the temperature of the air surrounding the spheres should not exceed 250° C., and a suitable air temperature may vary between 80° and 200° C., preferably between 100° and 150° C.

The microspheres are dosed onto the belt by means of a dosing device (C) which may be in the form of a dosing screw (7) combined with a vibrating feeder (8) having two mechanical vibrators. The vibrating feeder may also be provided with a transversely positioned sheet metal member (13) perpendicular to the bottom for uniform distribution of the spheres across the belt. To further promote the uniform distribution of the microspheres onto the belt, a screening cloth can be used which should be placed after the vibrating feeder so that the spheres will drop from the feeder through the screening cloth onto the belt. The dosing device may also consist of an elongated screw (11) only; see FIG. 2. The screw is mounted across the belt, and its casing has a longitudinally extending slot (12) through which the spheres are dosed. The free end of the screw is open to discharge any excess spheres. The collecting device (D) is in the form of a collecting funnel (9) connected with the vacuum conveyors (10).

For operating the apparatus, the belt conveyor and the IR lamps are started. The belt is heated by the lamps before the dosing device and the vacuum conveyors are started. The dry unexpanded microspheres are dosed in the desired amount onto the belt so that a uniform layer of spheres is formed across the belt. The microspheres are then conducted by the belt from one end of the belt conveyor to the other where they are collected by the collecting funnel and sucked up by the vacuum conveyors. When the microspheres are conducted by the belt from one end of the belt conveyor to the other, they will pass the IR lamps to be heated and expanded. The vacuum conveyors conduct the finished free-running expanded microspheres to a suitable collecting vessel (14). The belt velocity, the power of the IR lamps, and the dosed amount of microspheres are parameters that must be controlled, which is easily done by the plant operator for each separate plant and for the various types of microspheres to impart thereto the desired density.

EXAMPLE

To illustrate the importance of the dry solids content for obtaining expanded spheres without agglomerates, a number of tests were conducted in which spheres of varying dry solids contents were expanded. The shells of the spheres consisted of 55% by weight vinylidene chloride, 45% by weight acrylonitrile, and 5% by weight methyl methacrylate, and the isobutane blowing agent. The amount of agglomerates was measured as the amount of screening residue after screeening of the expanded sample. The greater the screening residue after screening, the greater was the amount of agglomerates. The screening residue was determined by wet screening on a 100 μm screen. The samples had been dried in a Morton type mixer and expanded in a heating cabinet on trays or aluminium foil. The density of the expanded material was measured in a Beckman Pyknometer. The test results are shown in the Table below.

TABLE 1

| Dry solids content % | Exp. temp. C. | Exp. time min. | Density d/1.19 | Screening residue % (100 μm) |
| --- | --- | --- | --- | --- |
| 99.8 | 124 | 6 | 42.4 | 0.06 |
| 99.8 | 124 | 7 | 28.4 | 0.08 |
| 99.8 | 127 | 6 | 24.0 | 0.32 |
| 99.8 | 127 | 6 | 34.7 | 0.05 |
| 99.2 | 129 | 6 | 39.0 | 0.39 |
| 98.8 | 130 | 5 | 34.7 | 0.96 |
| 98.8 | 129 | 5 | 38.8 | 0.82 |
| 98.0 | 127 | 6 | 34.0 | 2.12 |
| 98.0 | 126 | 6 | 39.3 | 2.12 |
| 97.2 | 127 | 6 | 23.6 | 1.16 |
| 97.1 | 127 | 6 | 30.3 | 1.07 |
| 96.5 | 127 | 6 | 32.6 | 1.17 |
| 93.6 | 127 | 6 | 22.8 | 1.78 |
| 92.8 | 127 | 6 | 31.9 | 1.07 |
| 90.0 | 127 | 7 | 22.1 | 1.32 |
| 87.0 | 127 | 7 | 22.2 | 2.1 |
| 75.6 | 128 | 7 | 26.4 | 12.5 |

As will appear from the Table, the screening residue and thus the amount of agglomerates is markedly lower for spheres having a dry solids content exceeding 98% than for spheres having a dry solids content of 98% and less.

To show that microspheres that had been dried to a dry solids content exceeding 98% can be expanded without increased amounts of agglomerate, even if they have absorbed moisture, the following tests were conducted. Microspheres dried to a dry solids content of 99.1% were stored in humid environment (100% relative humidity). Samples were taken at different intervals, the moisture content was determined, and the samples expanded. The results are shown in Table 2. Two different types of microspheres were used. The result above the dashed line in the Table refers to microspheres having a shell composition of 55% by weight vinylidene chloride, 45% by weight acrylonitrile, and 5% by weight methyl methacrylate. The results below the dashed line relate to spheres having a shell composition of 25% by weight vinylindene chloride, 75% by weight acrylonitrile, and 50% by weight methyl methacrylate.

TABLE 2

| Time days | Moisture content % | Exp. temp. C. | Exp. time min. | Density d/1.19 | Screening residue % (100 μm) |
| --- | --- | --- | --- | --- | --- |
| 3 | 3.5 | 130 | 7 | 25.9 | 0.07 |
| 8 | 5.3 | 130 | 7 | 25.1 | 0.11 |
| 8 | 5.3 | 130 | 7 | — | 0.16 |
| 8 | 5.3 | 130 | 8 | — | 0.84 |
| 18 | 15.4 | 130 | 7 | 46.6 | 0.10 |
| 18 | 15.4 | 130 | 8 | 42.2 | 0.17 |
| 18 | 15.4 | 129 | 6 | 24.5 | 0.19 |
| 37 | 15 | 126 | 7 | 43.0 | 0.04 |
| 22 | 9 | 129 | 9 | 20.2 | 0.16 |

What is claimed is:

1. An apparatus for expanding dried unexpanded microspheres, comprising a belt conveyor having an endless belt for conveying microspheres; a device for infrared radiation heating for expanding the microspheres, comprising a plurality of infrared radiation lamps and being located above the belt; a dosing device for the dried unexpanded microspheres, said dosing device being located at one end of the belt conveyor for dosing the unexpanded microspheres to the belt; a collecting device for the expanded microspheres, located at the other end of the belt conveyor for collecting the expanded microspheres from said belt, wherein the belt is made of polytetrafluoroethylene which has been subjected to antistatic treatment with an electrically conductive black pigment.

2. An apparatus as in claim 1, wherein the teflon belt is black.

3. An apparatus as in claim 1, wherein the belt conveyor comprises a sliding plate underneath the belt of an upper run of the belt conveyor.

4. An apparatus as in claim 1, wherein the dosing device comprises a dosing screw and a vibrating feeder.

5. An apparatus as in claim 4, wherein the vibrating feeder comprises a transversely positioned sheet metal member perpendicular to a feeder bottom.

6. An apparatus as in claim 1, wherein the dosing device comprises an extended dosing screw, the free end of which is open, and a screw casing having a longitudinally extending slot for discharging microspheres.

7. An apparatus as in claim 6, wherein the collecting device comprises a collecting funnel connected with vacuum conveyors.

* * * * *